United States Patent
Vaddi et al.

(10) Patent No.: US 11,261,845 B2
(45) Date of Patent: Mar. 1, 2022

(54) SYSTEM AND METHOD FOR PROTECTING WIND TURBINES DURING EXTREME WIND DIRECTION CHANGE

(71) Applicant: General Electric Company, Schenectady, NY (US)

(72) Inventors: Prashanth Reddy Vaddi, Bangalore (IN); Pranav Agarwal, Fermont, CA (US)

(73) Assignee: General Electric Company, Schenectady, NY (US)

( * ) Notice: Subject to any disclaimer, the term of this patent is extended or adjusted under 35 U.S.C. 154(b) by 230 days.

(21) Appl. No.: 16/045,888

(22) Filed: Jul. 26, 2018

(65) Prior Publication Data
US 2020/0032771 A1 Jan. 30, 2020

(51) Int. Cl.
F03D 7/04 (2006.01)
F03D 17/00 (2016.01)
F03D 7/02 (2006.01)

(52) U.S. Cl.
CPC ........... *F03D 7/043* (2013.01); *F03D 7/0224* (2013.01); *F03D 7/0276* (2013.01); *F03D 17/00* (2016.05); *F03D 7/0204* (2013.01); *F05B 2220/30* (2013.01); *F05B 2240/221* (2013.01); *F05B 2260/71* (2013.01); *F05B 2260/74* (2013.01);
(Continued)

(58) Field of Classification Search
CPC .... F03D 7/0204; F03D 7/0224; F03D 7/0296; F03D 7/0276; F03D 7/042; F03D 7/043; F03D 7/045; F03D 17/00; F05B 2270/20; F05B 2270/32; F05B 2270/321; F05B 2270/8041; F05B 2270/8042; F05B 2270/807
See application file for complete search history.

(56) References Cited

U.S. PATENT DOCUMENTS 7,896,614 B2 * 3/2011 Fisher ................ F03D 7/00 416/1
8,231,344 B2 * 7/2012 Kinzie ................ F03D 1/0608 416/1
(Continued)

FOREIGN PATENT DOCUMENTS

EP 2 644 887 A2 10/2013
WO WO2013/083131 A1 6/2013

OTHER PUBLICATIONS

European Search Report, dated Dec. 4, 2019.

*Primary Examiner* — Courtney D Heinle
*Assistant Examiner* — Sang K Kim
(74) *Attorney, Agent, or Firm* — Dority & Manning, P.A.

(57) ABSTRACT

A method for protecting a wind turbine from an extreme change in wind direction includes receiving a wind direction and/or a wind speed at the wind turbine. When a change in the wind direction or the wind speed exceeds a predetermined threshold, the method includes determining a margin to stall and/or zero lift of the at least one rotor blade of the wind turbine as a function of an angle of attack or change in the angle of attack at a blade span location of at least one rotor blade of the wind turbine. The method also includes implementing a corrective action for the wind turbine (without shutting down the wind turbine) when the margin to stall and/or zero lift exceeds a predetermined value so as to avoid stall and/or negative lift on the at least one rotor blade during operation of the wind turbine.

16 Claims, 5 Drawing Sheets

(52) U.S. Cl.
CPC ....... *F05B 2260/83* (2013.01); *F05B 2260/84* (2013.01); *F05B 2270/101* (2013.01); *F05B 2270/20* (2013.01); *F05B 2270/32* (2013.01); *F05B 2270/321* (2013.01); *F05B 2270/404* (2013.01); *F05B 2270/807* (2013.01); *F05B 2270/8041* (2013.01); *F05B 2270/8042* (2013.01)

(56) References Cited

U.S. PATENT DOCUMENTS

| | | |
|---|---|---|
| 8,907,511 B2 | 12/2014 | Bowyer et al. |
| 9,261,076 B2* | 2/2016 | Abdallah ............... F03D 7/0224 |
| 9,745,958 B2 | 8/2017 | Agarwal et al. |
| 2008/0112807 A1* | 5/2008 | Uphues .................. F03D 17/00 |
| | | 416/1 |
| 2009/0169378 A1* | 7/2009 | Menke .................. F03D 7/0224 |
| | | 416/1 |
| 2012/0009062 A1 | 1/2012 | Ingram et al. |
| 2013/0140819 A1 | 6/2013 | Abdallah et al. |
| 2013/0259682 A1* | 10/2013 | Kammer ............... F03D 7/0256 |
| | | 416/1 |
| 2014/0140843 A1 | 5/2014 | Spruce et al. |
| 2015/0030448 A1 | 1/2015 | Andersen et al. |
| 2015/0093242 A1 | 4/2015 | Enevoldsen |
| 2016/0222944 A1* | 8/2016 | Stoltenjohannes ... F03D 7/0204 |

* cited by examiner

SYSTEM AND METHOD FOR PROTECTING WIND TURBINES DURING EXTREME WIND DIRECTION CHANGE

FIELD

The present invention relates generally to wind turbines, and more particularly, to systems and methods for protecting wind turbines during extreme wind direction changes.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

A power output of the generator increases with wind speed until the wind speed reaches a rated wind speed for the turbine. At and above the rated wind speed, the generator operates at a rated power. The rated power is an output power at which the generator can operate with a level of fatigue or extreme load to turbine components that is predetermined to be acceptable. At wind speeds higher than a certain speed, typically referred to as a "trip limit," the wind turbine may implement a control action, such as shutting down or de-rating the wind turbine in order to protect wind turbine components from damage.

At times, wind turbines may experience sudden change in wind direction due to the stochastic nature of wind, thereby causing extreme loading on the wind turbine. In order to minimize the impact of extreme loads on the wind turbine, conventional protection control schemes shut down the wind turbine when the change in the wind direction exceeds predetermined threshold limits.

Conventional protection control schemes can lead to a large number of trips in the field, which impacts the availability of the wind turbine to produce power. Such control schemes can also cause higher than normal extreme loading on various wind turbine components.

Accordingly, systems and methods for protecting wind turbines during extreme wind direction changes so as to reduce the shut down time and/or reduce the number of trips associated with conventional control schemes would be desired in the art.

BRIEF DESCRIPTION

Aspects and advantages of the invention will be set forth in part in the following description, or may be obvious from the description, or may be learned through practice of the invention.

In one aspect, the present disclosure is directed to a method for protecting a wind turbine from an extreme change in wind direction. The method includes receiving, via the controller, a wind direction and/or a wind direction at the wind turbine. When a change in the wind direction or the wind speed exceeds a predetermined threshold, the method includes determining, via the controller, a margin to stall and/or zero lift of the at least one rotor blade of the wind turbine as a function of an angle of attack or change in the angle of attack at a blade span location of at least one rotor blade of the wind turbine. The method also includes implementing, via the controller, a corrective action for the wind turbine (without shutting down the wind turbine) when the margin to stall and/or zero lift exceeds a predetermined value so as to avoid stall and/or negative lift on the at least one rotor blade during operation of the wind turbine.

In one embodiment, the method may include determining the angle of attack or the change in the angle of attack at the blade span location of at least one rotor blade of the wind turbine as a function of one or more of the following: a wind speed at the wind turbine, a rotor speed of the wind turbine, a pitch angle of the at least one rotor blade, a structure twist of the at least one rotor blade, and/or a rotor azimuth, or combinations thereof. In another embodiment, the method may also include determining the margin to stall and/or zero lift of the rotor blade(s) of the wind turbine as a function of one or more aerodynamic airfoil properties of the rotor blade(s). In yet another embodiment, the method may include determining the margin to stall and/or zero lift of the rotor blade(s) of the wind turbine as a function of changes in direction of one or more thrust coefficients or power coefficients and/or derivatives thereof. In still further embodiments, the method may also include determining the margin to stall and/or zero lift of the rotor blade(s) of the wind turbine using look-up tables and/or computer simulation.

In further embodiments, the method may include monitoring the wind speed and/or the wind direction via one or more sensors that are communicatively coupled to the controller. For example, in one embodiment, the sensor(s) may include a wind vane, one or more anemometers (such as a pair of anemometers), a Light Detection and Ranging (LIDAR) sensor, or any other suitable wind sensor.

In additional embodiments, the step of implementing the corrective action for the wind turbine when the margin to stall and/or zero lift exceeds the predetermined value may include, for example, pitching one or more rotor blades of the wind turbine, modifying a rotor speed of the wind turbine, and/or activating one or more actuators along the at least one rotor blade to change a flow characteristic of the rotor blade(s).

More specifically, in one embodiment, the step of pitching the one or more rotor blades of the wind turbine may include collectively pitching all of the rotor blades of the wind turbine to a predetermined pitch angle. In alternative embodiments, the step of pitching the one or more rotor blades of the wind turbine may include individually pitching each of the rotor blades of the wind turbine to one or more pitch angles. For example, in such embodiments, the step of individually pitching each of the rotor blades of the wind turbine to one or more pitch angles may include individually pitching each of the rotor blades of the wind turbine to different pitch angles.

In another aspect, the present disclosure is directed to a system for protecting a wind turbine from an extreme change in wind direction. The system includes one or more sensors configured to monitor wind direction and/or wind speed at the wind turbine and a controller communicatively coupled to the sensor(s). The controller includes one or more processors configured to perform one or more operations, including but not limited to receiving the wind direction and/or the wind speed, determining an angle of attack or a change in the angle of attack at a blade span location of at least one rotor blade of the wind turbine, determining a margin to stall and/or zero lift of the at least one rotor blade of the wind turbine as a function of the angle of attack when a change in the wind direction exceeds a predetermined threshold, and implementing a corrective action for the wind turbine when the margin to stall and/or zero lift exceeds a predetermined value so as to avoid stall and/or negative lift on the at least one rotor blade. The system of the present disclosure may also include any of the additional features as described herein.

These and other features, aspects and advantages of the present invention will become better understood with reference to the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
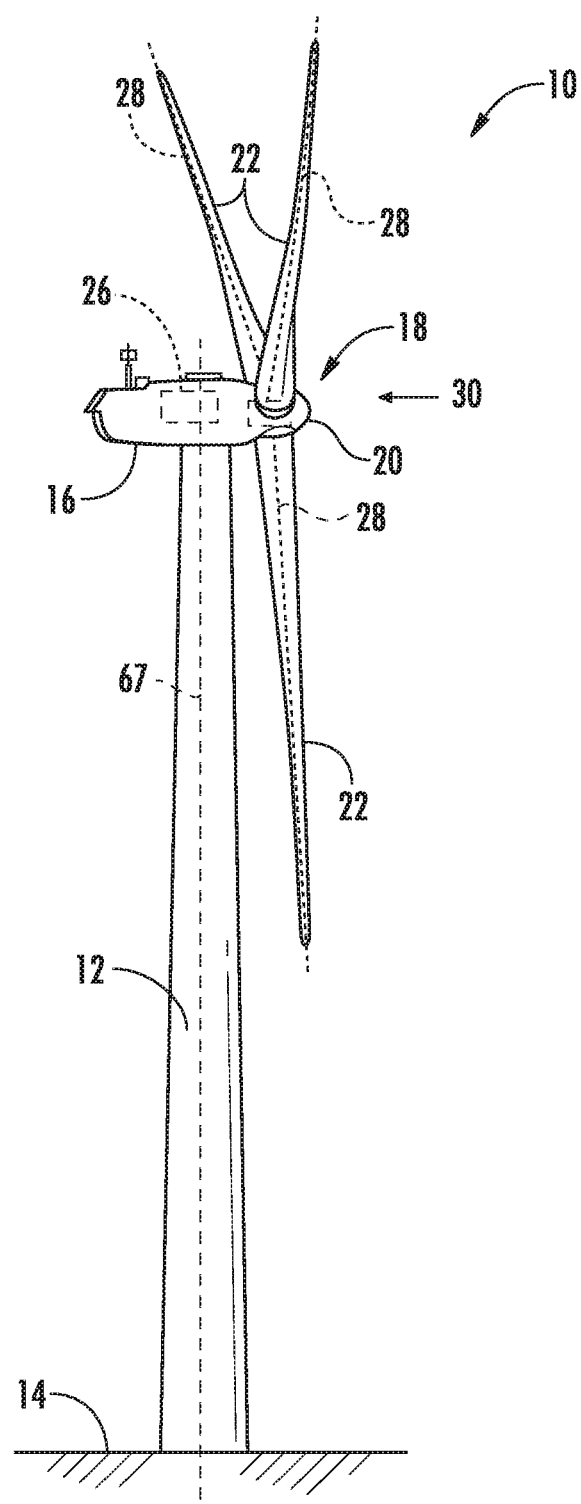
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. In other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a correction action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 2:
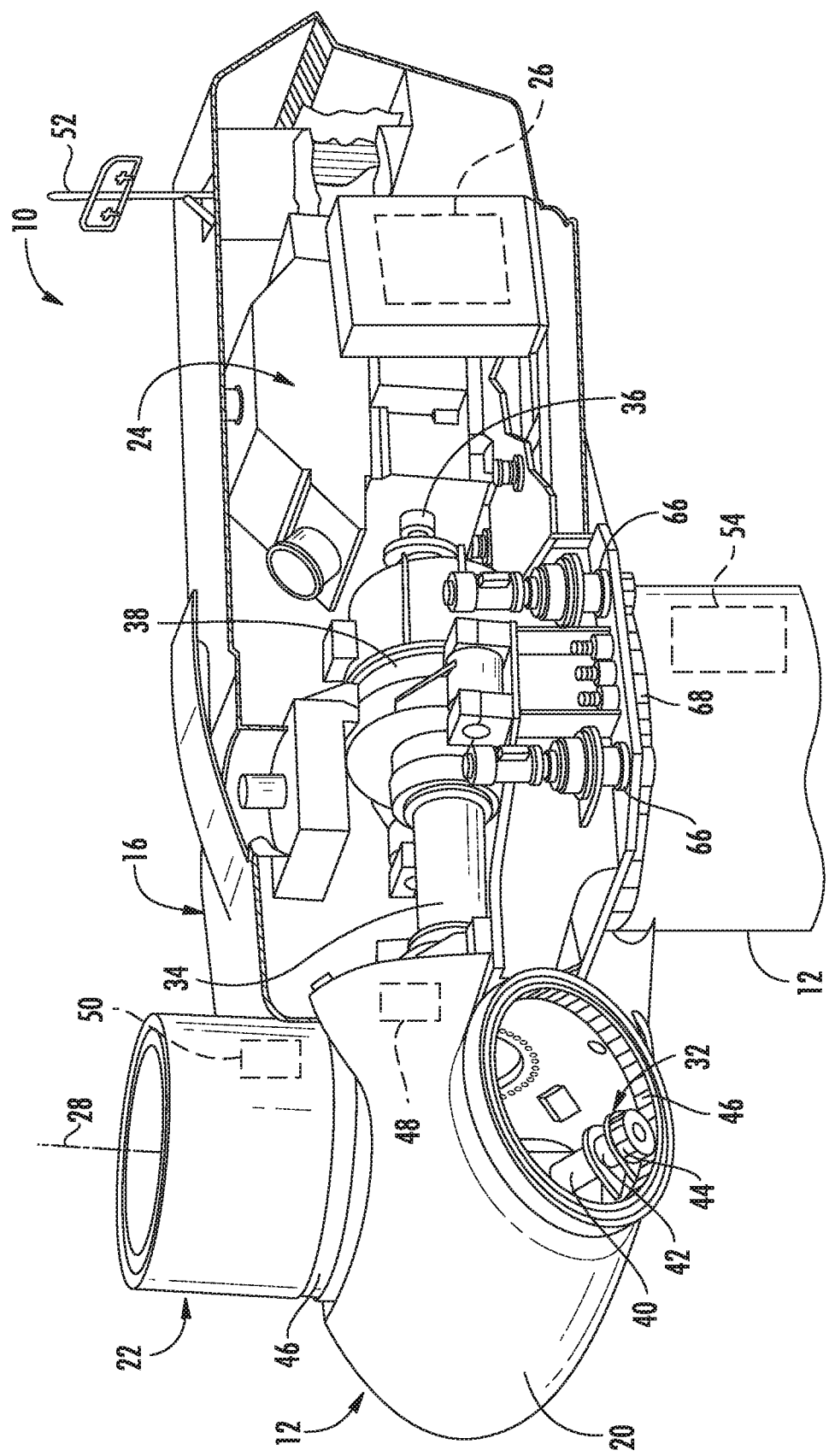
FIG. 2 illustrates a simplified, internal view of one embodiment of a nacelle of a wind turbine.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Still referring to FIG. 2, each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind direction 30 (e.g., by engaging a yaw bearing 68 of the wind turbine 10 so as to rotate the nacelle about a yaw axis 67 (FIG. 1)).

The wind turbine 10 may also include one or more sensors 48, 50, 52, 54 for measuring various operating and/or wind parameters of or at the wind turbine 10. For example, as shown in FIG. 2, a sensor(s) 48 may be located on the hub 20 so as to measure hub loads of the wind turbine 10. In addition, a sensor(s) 50 may be located on one or more of the rotor blades 22 so as to measure loads thereof. Further, a sensor(s) 54 may be located on the tower 12 of the wind turbine 10 to measure loads thereof. Moreover, the wind turbine 10 may include one or more wind sensors 52 for measuring various wind and/or environmental parameters of the wind turbine 10. For example, such parameter(s) may include wind gusts, wind speed, wind direction, wind acceleration, wind turbulence, wind shear, wind veer, wake, or similar, as well as air density, air moisture, humidity, pressure, temperature, or any other environmental condition.

In alternative embodiments, the sensors 48, 50, 52, 54 may be any other suitable sensors capable of measuring operating and/or wind parameters of the wind turbine 10. For example, the sensors may be accelerometers, pressure sensors, angle of attack sensors, vibration sensors, MIMU sensors, camera systems, fiber optic systems, anemometers, wind vanes, Sonic Detection and Ranging (SODAR) sensors, Light Detection and Ranging (LIDAR) sensors, infra lasers, radiometers, pitot tubes, rawinsondes, other optical sensors, and/or any other suitable sensors. It should be appreciated that, as used herein, the term "monitor" and variations thereof indicates that the various sensors of the wind turbine may be configured to provide a direct measurement of the parameters being monitored or an indirect measurement of such parameters. Thus, the sensors 48, 50, 52, 54 may, for example, be used to generate signals relating to the parameter being monitored, which can then be utilized by the controller 26 to determine the actual condition.

Figure 3:
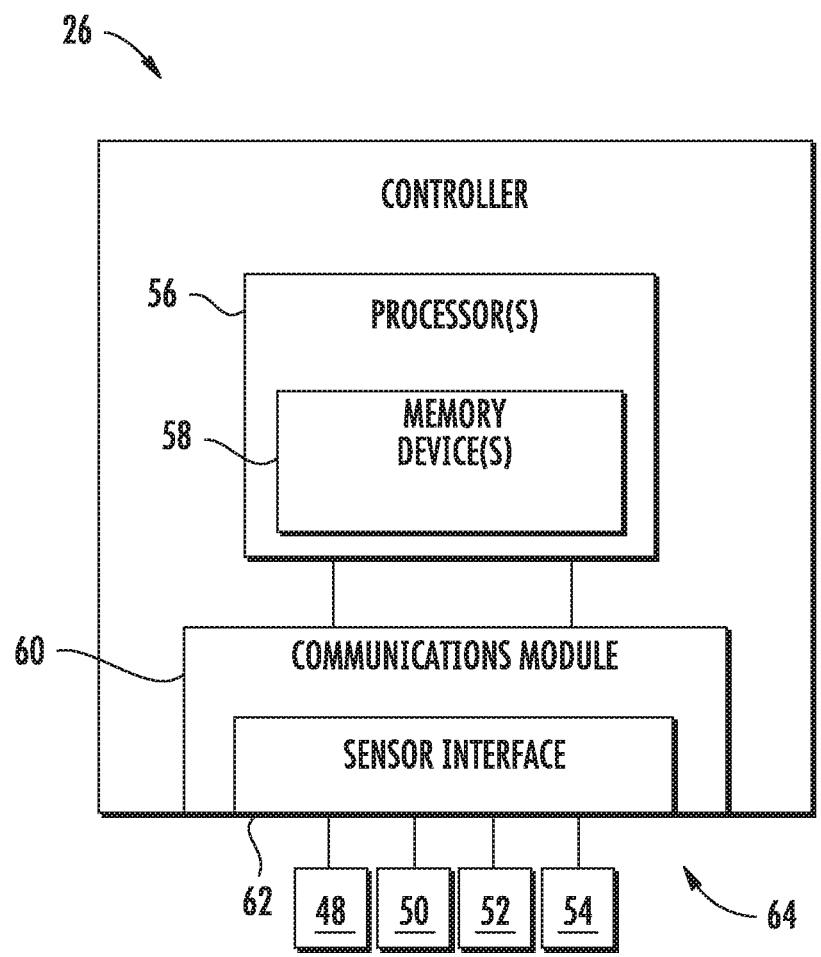
FIG. 3 illustrates a schematic diagram of one embodiment of a controller according to the present disclosure.

Referring specifically to FIG. 3, there is illustrated a block diagram of one embodiment of the controller 26 according to the present disclosure. As shown, the controller 26 may include one or more processor(s) 56 and associated memory device(s) 58 configured to perform a variety of computer-implemented functions (e.g., performing the methods, steps, calculations and the like and storing relevant data as disclosed herein). Additionally, the controller 26 may also include a communications module 60 to facilitate communications between the controller 26 and the various components of the wind turbine 10. Further, the communications module 60 may include a sensor interface 62 (e.g., one or more analog-to-digital converters) to permit signals transmitted from the sensors 48, 50, 52, 54 to be converted into signals that can be understood and processed by the processors 56. It should be appreciated that the sensors 48, 50, 52, 54 may be communicatively coupled to the communications module 60 using any suitable means. For example, as shown in FIG. 3, the sensors 48, 50, 52, 54 are coupled to the sensor interface 62 via a wired connection. However, in other embodiments, the sensors 48, 50, 52, 54 may be coupled to the sensor interface 62 via a wireless connection, such as by using any suitable wireless communications protocol known in the art. As such, the processor 56 may be configured to receive one or more signals from the sensors 48, 50, 52, 54.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 58 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 58 may generally be configured to store suitable computer-readable instructions that, when implemented by the processor(s) 58, configure the controller 26 to perform various functions including, but not limited to, estimating one or more wind parameters of the wind turbine 10 based on the plurality of operating data, transmitting suitable control signals to implement control actions in response to the detection of transient wind conditions and various other suitable computer-implemented functions.

Figure 4:
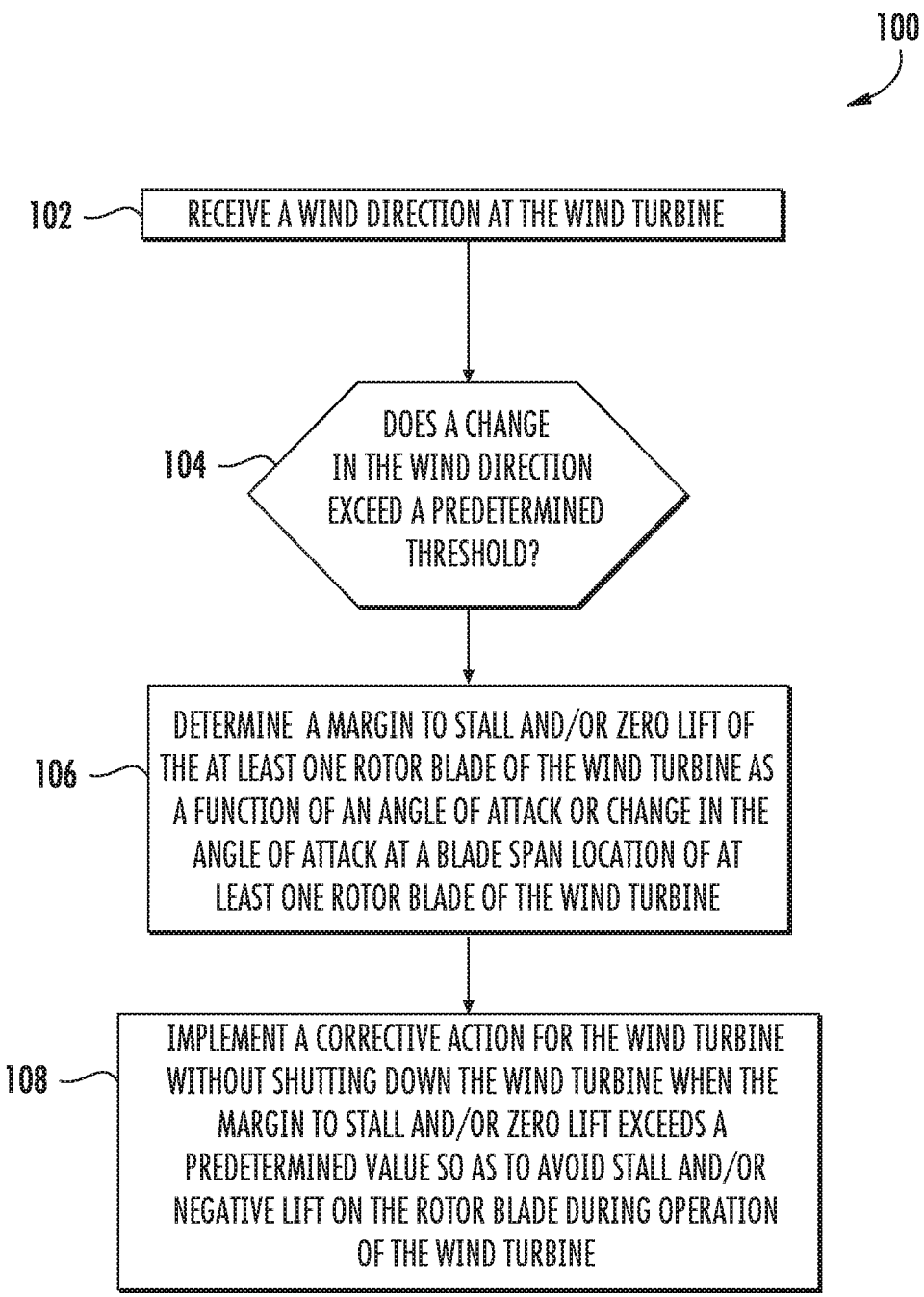
FIG. 4 illustrates a flow diagram of one embodiment of a method for protecting a wind turbine from an extreme change in wind direction according to the present disclosure.

Referring now to FIG. 4, a flow diagram of one embodiment of a method 100 for protecting a wind turbine, such as the wind turbine 10 of FIG. 1, from extreme changes in wind direction is illustrated. In general, the method 300 will be described herein with reference to the wind turbine 10 described above with reference to FIGS. 1-3. However, it should be appreciated by those of ordinary skill in the art that the disclosed method 100 may generally be utilized to control the operation of any other suitable power system (such as wind and/or solar power systems) having any suitable configuration, and/or systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at 102, the method 100 includes receiving, via the controller, a wind direction at the wind turbine 10. More specifically, in one embodiment, the method 100 may include monitoring the wind speed and/or wind direction via one or more of the sensors 48, 50, 52, 54 and sending the monitored sensor signals to the controller 26 for processing. For example, in one embodiment, the sensor(s) 48, 50, 52, 54 may include a wind vane, one or more anemometers (such as a pair of anemometers), a Light Detection and Ranging (LIDAR) sensor, or any other suitable wind sensor.

Further, as shown at 104, the method 100 includes determining whether a change in the wind direction exceeds a predetermined threshold. In one embodiment, the method 100 may include determining the predetermined threshold based on wind turbine 10 design calculations. Thus, wind directions exceeding the predetermined threshold are indicative of extreme wind direction changes occurring at the wind turbine 10. For example, the calculations for thresholds can be based on loads simulation for lateral wind directions and compared against stress envelopes of wind turbine components. Further, the ability to detect sudden changes in wind direction early allows the controller 26 to act and prevent extreme loading. Conservative thresholds accounting for uncertainty in wind direction measurements can also be calculated, which minimize false positives and overall trips.

Still referring to FIG. 4, if the change in the wind direction exceeds the predetermined threshold, as shown at 106, the method 100 may include determining a margin to stall and/or zero lift of the rotor blade(s) 22 as a function of an angle of attack or change in the angle of attack at a blade span location of the rotor blade(s) 22.

Figure 5:
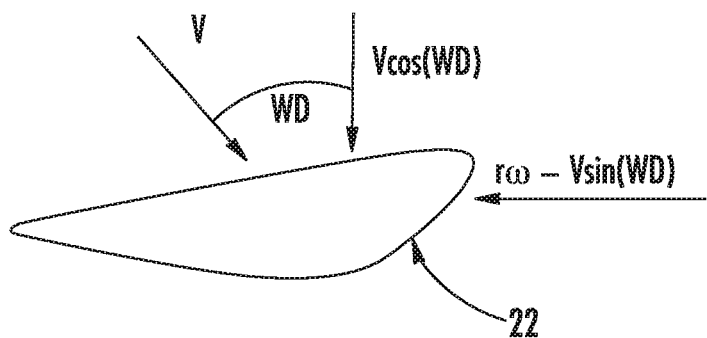
FIG. 5 illustrates a cross-sectional view of one embodiment of a rotor blade of a wind turbine according to the present disclosure, particularly illustrating wind acting at particular blade span position which is close to stall.

For example, as shown in FIG. 5, a cross-sectional view of one embodiment of a certain span location of the rotor blade 22 is illustrated. As shown, the wind acting on the rotor blade 22 is close to stall. In such situations, the controller 26 may use Equation (1) below to determine an additional minimum pitch angle to achieve a predetermined stall margin (e.g. such as 70%):

$$AOA_\Delta = (\tan^{-1}(0.7*\lambda)) - (\tan^{-1}(0.7*\lambda - \tan(WD))) \quad \text{Equation (1)}$$

Where $AOA_\Delta$ is the angle of attack to prevent stall,
WD is the wind direction, and
$\lambda$ is the tip speed ratio.

Figure 6:
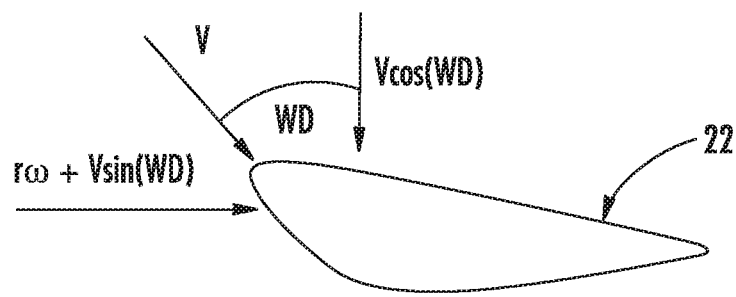
FIG. 6 illustrates a cross-sectional view of one embodiment of a rotor blade of a wind turbine according to the present disclosure, particularly illustrating wind acting at particular blade span position which is close to zero lift.

In addition, as shown in FIG. 6, a cross-sectional view of another embodiment of a certain span location of the rotor blade 22 is illustrated. As shown, the wind acting on the rotor blade 22 is close to zero lift. In such situations, the controller 26 may use Equations (2) and (3) below to determine a maximum limit on fine pitch to prevent negative lift at a certain blade span:

$$FinePitch_{0lift} = 90 - \tan^{-1}(0.7*\lambda + \tan(WD)) - AOA_{0lift} - \text{Structural Twist} \quad \text{Equation (2)}$$

$$FinePitch = \max(\text{Minimum Pitch} + AOA_\Delta, FinePitch_{0lift}) \quad \text{Equation (3)}$$

Where $FinePitch_{0lift}$ is the fine pitch at negative lift,
$\lambda$ is the tip speed ratio,
WD is the wind direction,
$AOA_{0lift}$ is the angle of attack at negative lift,
Structural Twist is an example aerodynamic characteristic of the rotor blade, and
FinePitch is the fine pitch to prevent negative lift.

In such embodiments, the method 100 may include determining the angle of attack or the change in the angle of attack at the blade span location of the rotor blade(s) 22 as a function of one or more of the following: a wind speed at the wind turbine, a rotor speed of the wind turbine 10, a pitch angle of the rotor blade(s) 22, a structure twist of the rotor blade(s) 22, and/or a rotor azimuth, or combinations thereof. For example, in one embodiment, the controller 26 may be configured to determine the angle of attack using Equation (4) below:

$$AOA = \tan^{-1}\left(\frac{V \cos WD}{r\omega + V \sin(WD) * \cos(\text{rotor azimuth})}\right) - \text{Pitch} - \text{Structural Twist} \quad \text{Equation (4)}$$

Where AOA is the angle of attack,
$\upsilon$ is the wind speed,
WD is the wind direction,
r is the radius,
$\omega$ is the rotor speed,
rotor azimuth is the rotor azimuth angle,
Pitch is the pitch angle, and
Structural Twist is an example aerodynamic characteristic of the rotor blade.

In another embodiment, the method 100 may also include determining the margin to stall and/or zero lift of the rotor blade(s) 22 as a function of one or more aerodynamic airfoil properties of the rotor blade(s) 22 and/or changes in direction of one or more thrust or power coefficients and/or derivatives thereof. In addition, the method 100 may also include determining the margin to stall and/or zero lift of the rotor blade(s) 22 using look-up tables, computer simulation, and/or using any other suitable software programs or similar.

Referring back to FIG. 4, as shown at 108, the method 100 includes implementing a corrective action for the wind turbine 10, i.e., without shutting down the wind turbine 10, to prevent the stall or the zero lift from occurring on any of the rotor blades during operation of the wind turbine 10. For example, in several embodiments, the step of implementing the corrective action may include, for example, pitching one or more rotor blades 22 of the wind turbine 10, derating the wind turbine 10 (e.g. by modifying a rotor speed of the wind turbine 10), and/or activating one or more actuators along the rotor blade(s) 22 to change a flow characteristic of the rotor blade(s) 22.

More specifically, in one embodiment, the step of pitching one or more of the rotor blades 22 may include collectively pitching all of the rotor blades 22 to a predetermined pitch angle. In alternative embodiments, the controller 26 may be configured to include individually pitch each of the rotor blades 22 to one or more pitch angles. For example, in such embodiments, the controller 26 may be configured to individually pitch each of the rotor blades 22 to different pitch angles.

In particular embodiments, the collective angle of attack (or common mode angle of attack between the rotor blades 22) may be modulated in conjunction with cyclic pitching and the rotor speed to reduce loads by simultaneously avoiding stall as well areas of negative lift on a sustained basis. Such control actions contribute to reducing the imbalance loads and also assist with riding through extreme wind direction changes without shutting down the wind turbine 10.

In addition, as used herein, derating the wind turbine 10 may include speed de-rating, torque de-rating or a combination of both. Further, the wind turbine 10 may be de-rated by reducing speed and increasing torque, which can be beneficial so as to maintain power. In another embodiment, the wind turbine 10 may be temporarily de-rated by modifying the torque demand on the generator 24. In general, the torque demand may be modified using any suitable method, process, structure and/or means known in the art. For instance, in one embodiment, the torque demand on the generator 24 may be controlled using the controller 26 by transmitting a suitable control signal/command to the generator 24 in order to modulate the magnetic flux produced within the generator 24.

The wind turbine 10 may also be temporarily de-rated by yawing the nacelle 16 to change the angle of the nacelle 16 relative to the direction of the wind 30. In other embodiments, the controller 26 may be configured to actuate one or more mechanical brake(s) or activate an airflow modifying element on a rotor blade in order to reduce the rotational speed and/or load of the rotor blades 14, thereby reducing component loading. In still further embodiments, the controller 26 may be configured to perform any appropriate control action known in the art. Further, the controller 26 may implement a combination of two or more control actions.

It should also be appreciated that an advantage of the present invention is that the system and method may be implemented using existing components of the wind turbine 10. As such, a user is not required to purchase, install, and maintain new equipment. Further, the controller 26 may be integrated with a broader control system, such as, but not limiting of, a wind turbine control system, a plant control system, a remote monitoring system, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for protecting a wind turbine having a plurality of rotor blades from an extreme change in wind direction, the method comprising:
    receiving, via the controller, at least one of a wind direction or a wind speed at the wind turbine;
    when a change in the wind direction or the wind speed exceeds a predetermined threshold, determining, via the controller, a margin of at least one of the plurality of rotor blades to stall, and a margin of the at least one of the plurality of rotor blades to zero lift, at a blade span location of the at least one of the plurality of rotor blades at the at least one of a wind direction or a wind speed;
    determining, via the controller, an angle of attack that establishes both the margin to stall and the margin to zero lift at values that satisfy a predetermined stall margin and a predetermined margin to zero lift of the at least one of the plurality of rotor blades at the blade span location as a function of the wind direction, a tip speed ratio, and a structure twist; and
    without shutting down the wind turbine, modulating the angle of attack at the blade span location by pitching the at least one of the plurality of rotor blades and reducing a rotor speed of the wind turbine to prevent stall and zero lift from occurring on the at least one of the plurality of rotor blades during operation of the wind turbine.

2. The method of claim 1, further comprising determining the angle of attack as a function of one or more of the following: a wind speed at the wind turbine, the rotor speed of the wind turbine, a pitch angle of one or more of the plurality of rotor blades, or a rotor azimuth.

3. The method of claim 2, wherein the determining of the margin of at least one of the plurality of rotor blades to stall, and the margin of the at least one of the plurality of rotor blades to zero lift, at the blade span location of the at least one of the plurality of rotor blades is a function of changes in direction of one or more thrust coefficients or power coefficients and/or derivatives thereof.

4. The method of claim 2, wherein the determining the margin of at least one of the plurality of rotor blades to stall, and the margin of the at least one of the plurality of rotor blades to zero lift, at the blade span location of the plurality of rotor blades comprises using at least one of one or more look-up tables or computer simulation.

5. The method of claim 2, further comprising monitoring the wind speed and/or the wind direction via one or more sensors that are communicatively coupled to the controller.

6. The method of claim 5, wherein the one or more sensors comprise at least one of a wind vane, one or more anemometers, or a Light Detection and Ranging (LIDAR) sensor.

7. The method of claim 1, further comprising at least one of modifying a rotor speed of the wind turbine or activating one or more actuators along the at least one of the plurality of rotor blades to change a flow characteristic of the at least one of the plurality of rotor blades.

8. The method of claim 1, wherein the pitching of the plurality of rotor blades further comprises individually pitching each of the plurality of rotor blades cyclically to different pitch angles.

9. A system for protecting a wind turbine having a plurality of rotor blades from an extreme change in wind direction, the system comprising:
    one or more sensors configured to monitor at least one of wind direction or wind speed at the wind turbine;
    a controller communicatively coupled to the one or more sensors, the controller comprising one or more processors configured to perform one or more operations, the one or more operations comprising:
        receiving at least one of a wind direction or a wind speed at the wind turbine;
        when a change in the wind direction or the wind speed exceeds a predetermined threshold, determining a margin of at least one of the plurality of rotor blades to stall, and a margin of the at least one of the plurality of rotor blades to zero lift, at a blade span location of the at least one of the plurality of rotor blades at the at least one of a wind direction or a wind speed;
        determining an angle of attack that establishes both the margin to stall and the margin to zero lift at values that satisfy a predetermined stall margin and a predetermined margin to zero lift of the at least one of the plurality of rotor blades at the blade span location as a function of the wind direction, a tip speed ratio, and a structure twist; and
        without shutting down the wind turbine, modulating the angle of attack at the blade span location by pitching the at least one of the plurality of rotor blades and reducing a rotor speed of the wind turbine to prevent stall and zero lift from occurring on the at least one of the plurality of rotor blades during operation of the wind turbine.

10. The system of claim 9, wherein determining the angle of attack further comprises determining the angle of attack as a function of one or more of the following: a wind speed at the wind turbine, the rotor speed of the wind turbine, a pitch angle of one or more of the plurality of rotor blades, or a rotor azimuth.

11. The system of claim 10, wherein the determining of the margin of at least one of the plurality of rotor blades to stall, and the margin of the at least one of the plurality of rotor blades to zero lift, at the blade span location of the at least one of the plurality of rotor blades is a function of changes in direction of one or more thrust coefficients or power coefficients and/or derivatives thereof.

12. The system of claim 10, wherein the one or more operations further comprise determining the margin of at least one of the plurality of rotor blades to stall, and the margin of the at least one of the plurality of rotor blades to zero lift, at the blade span location of the plurality of rotor blades using at least one of one or more look-up tables or computer simulation.

13. The system of claim 10, wherein the one or more operations further comprise monitoring the wind speed and/or the wind direction via one or more sensors that are communicatively coupled to the controller.

14. The system of claim 13, wherein the one or more sensors comprise at least one of a wind vane, one or more anemometers, or a Light Detection and Ranging (LIDAR) sensor.

15. The system of claim 9, wherein further comprising at least one of modifying a rotor speed of the wind turbine or activating one or more actuators along the at least one of the plurality of rotor blades to change a flow characteristic of the at least one of the plurality of rotor blades.

16. The system of claim 15, wherein pitching the plurality of rotor blades further comprises individually pitching each of the plurality of rotor blades to one or more pitch angles.

* * * * *